United States Patent
Eichenhofer et al.

(10) Patent No.: US 6,893,622 B2
(45) Date of Patent: May 17, 2005

(54) PROCESS FOR THE COMBUSTION OF SULPHUR FOR THE PREPARATION OF OLEUM AND SULPHURIC ACID WITH REDUCED $(NO)_X$ CONTENT

(75) Inventors: Kurt-Wilhelm Eichenhofer, Leverkusen (DE); Klaus-Peter Grabowski, Wermelskirchen (DE); Günter Dräger, Leverkusen (DE); Martin Kürten, Bergisch Gladbach (DE); Martin Schweitzer, Leverkusen (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 10/230,835

(22) Filed: Aug. 29, 2002

(65) Prior Publication Data

US 2003/0077217 A1 Apr. 24, 2003

(30) Foreign Application Priority Data

Sep. 4, 2001 (DE) ......................................... 101 43 176

(51) Int. Cl.$^7$ ............................................. C01B 17/74
(52) U.S. Cl. ........................ 423/522; 423/523; 423/533; 423/535; 423/543
(58) Field of Search ................................ 423/522, 523, 423/533, 535, 543, 540, 235, 244.1

(56) References Cited

U.S. PATENT DOCUMENTS

| | | | |
|---|---|---|---|
| 3,656,900 A | * | 4/1972 | Drechsel et al. ............ 423/522 |
| 3,907,979 A | * | 9/1975 | Jenniges ..................... 423/522 |
| 3,936,275 A | | 2/1976 | Perret et al. .................. 23/278 |
| 4,256,721 A | * | 3/1981 | Blakey et al. .............. 423/540 |
| 5,389,354 A | | 2/1995 | Brändle et al. ............. 423/522 |
| 5,807,530 A | | 9/1998 | Anderson .................... 423/543 |

FOREIGN PATENT DOCUMENTS

| | | | |
|---|---|---|---|
| DE | 1 792 348 | 10/1971 | ........... C01B/17/76 |
| DE | 28 31 941 A1 | 2/1980 | ........... C01B/17/94 |

OTHER PUBLICATIONS

Ulmanns Encyklopaedie Der Technischen Chemie, Verlag, Chemie, Weinheim, De Bd. 21, 1982, Seiten 35–40, XP002255919 *das ganze document*, (no month).

* cited by examiner

*Primary Examiner*—Wayne A. Langel
(74) *Attorney, Agent, or Firm*—Diderico van Eyl; Godfried R. Akorli (57) ABSTRACT

The invention relates to a process for the continuous preparation of oleum of a concentration of 10 to 45% by weight of $SO_3$ and/or sulphuric acid of a concentration of 94 to 100% by weight of $H_2SO_4$ by combustion of sulphur with atmospheric oxygen according to the principle of superstoichiometric combustion, cooling the resultant sulphur-dioxide-containing gases to 350° C. to 500° C., catalytic conversion of these cooled gases to give sulphur-trioxide-containing gases in the presence of a vanadium-containing catalyst using single or double contact catalysis, absorption of the sulphur-trioxide-containing gases after cooling, if appropriate removal of liquids from the gases after absorption and energy recovery, with liquid sulphur being injected into the hot combustion gas stream perpendicular to the main direction of flow in the form of a fan using one or more bimodal fan-type nozzles.

11 Claims, 5 Drawing Sheets

$K = \dfrac{\dot{m}(\text{mass flow of the atomizing gas})}{\dot{m}(\text{mass flow of the liquid})}$ $d_{50}$ = average droplet diameter $\dot{m}FL$ = mass flow of the liquid

PROCESS FOR THE COMBUSTION OF SULPHUR FOR THE PREPARATION OF OLEUM AND SULPHURIC ACID WITH REDUCED $(NO)_x$ CONTENT

BACKGROUND OF THE INVENTION

1. Field of the Invention

The invention relates to a process for the preparation of oleum having a concentration of 10 to 45% by weight of $SO_3$ and sulphuric acid having a concentration of 94 to 100% by weight by joint combustion of sulphur with atmospheric oxygen and if appropriate $SO_2$-containing and $(NO)_x$-containing gases from the thermal cleavage of sulphuric acid, conversion of the $SO_2$-containing gases to $SO_3$-containing gases in the presence of vanadium catalysts and absorption of the $SO_3$-containing gases to produce oleum and/or sulphuric acid.

2. Brief Description of the Prior Art

The literature discloses differing processes for the preparation of oleum and sulphuric acid. In the thermal processes (sulphur combustion using atmospheric oxygen, metal sulphide roasting, sulphuric acid cleavage, sulphate processes), in addition to sulphur-dioxide-containing gases, there are also formed nitrogen oxides, $(NO)_x$, which are produced directly from nitrogen and oxygen above 1 000° C. Additional $(NO)_x$ is introduced by the starting products themselves. Under the combustion conditions, $(NO)_x$ is without exception NO. The $(NO)_x$ is absorbed, as are also the sulphur-trioxide-containing gases which are formed from the $SO_2$-containing gases in the presence of the vanadium catalyst, so that the sulphuric acid formed or the oleum is contaminated with absorbed $(NO)_x$ in the form of nitrosylsulphuric acid. It is assumed that $(NO)_x$ is converted to nitrosylsulphuric acid in the following manner:

$$NO+SO_3 \rightarrow NO_2+SO_2 \qquad \text{Equation 1}$$

$$NO+NO_2+H_2SO_4 \rightarrow NOHSO_4+H_2O \qquad \text{Equation 2}$$

Nitrosylsulphuric acid, which is analytically detectable by hydrolysis with water to give $HNO_2$, is a powerful corrosive agent for steel and chrome-nickel stainless steels and leads to considerable surface erosion on apparatuses and piping. To reduce the nitrosylsulphuric acid content, therefore, according to a known proposal, 40% strength dihydrazine sulphate solution is introduced.

DE-A-4 002 465 describes a process by means of which up to 95% by weight of the total nitrogen oxides can be removed. DE-A-4 002 465 relates to a process for the continuous preparation of oleum at a concentration of 10 to 45% by weight $SO_3$ and/or $H_2SO_4$ by combustion of sulphur with atmospheric oxygen by the principle of superstoichiometric and substoichiometric combustion, cooling the resultant sulphur-dioxide-containing gases to 390° C. to 480° C., catalytic conversion of these gases to sulphur-trioxide-containing gases in the presence of a vanadium-containing catalyst using the principle of single or double contact catalysis, absorption of the sulphur-trioxide-containing gases after cooling, if appropriate removal of liquids from the gases after absorption and energy production, the combustion of sulphur with atmospheric oxygen being carried out with the addition of dry $SO_2$-containing gases which contain up to 5 000 ppm of $(NO)_x$, preferably less than 2 000 ppm of $(NO)_x$, calculated as NO. The $SO_2$-containing dry gases, which can contain up to 5 000 ppm of $(NO)_x$, calculated as NO, used are cleavage gases from the thermal cleavage of waste sulphuric acids, with these cleavage gases being able to contain 5 to 10% by volume of $O_2$, 5 to 8% by volume of $SO_2$, <200 ppm of CO, <1 000 ppm of $(NO)_x$, <50 ppm of hydrocarbon compounds and 82 to 90% by volume of $H_2O$, $N_2$ and $CO_2$. Using these processes, the dry $SO_2$-containing gases can be introduced directly into the combustion chamber in which sulphur is burnt with oxygen, or can be introduced into the combustion chamber after mixing with combustion air. It is important that the $SO_2$-containing gases (nitrous $SO_2$-containing gases) are burnt jointly with sulphur. In a temperature variant, sulphur is burnt at temperatures between 500° C. and 1 000° C. (measured at the outlet of the combustion chamber upstream of gas cooling), chiefly between 700° C. and 950° C.

The known process has the disadvantage that a breakdown of up to 95% by weight of $(NO)_x$ occurs. However, the residual amounts of $(NO)_x$, as may be seen from the examples, lead to concentrations of >25 mg of $NO/m^3$ (S.T.P.). In practice this means that in the preparation of oleum of high concentrations of 30 to 45% by weight, as is required for the preparation of pure sulphur trioxide and oleum 65%, virtually all of the $(NO)_x$ was absorbed in the form of nitrosylsulphuric acid and led to a high accumulation in the oleum cycles of the oleum distillation. Not until the concentration is below 27% free $SO_3$ does the degree of absorption of $(NO)_x$ decrease noticeably.

It is an object of the present invention, therefore, in the existing process, to decrease the $(NO)_x$ content considerably below 95% to contents of <5 mg of $NO/m^3$ (S.T.P.).

Surprisingly, this object is achieved by the inventive process. The advantages of the inventive process are the reduction of the nitrosylsulphuric acid content, the reduction of the maintenance costs which are caused by corrosion, and the complete avoidance of the use of dihydrazine sulphate solution within the meaning of the objective according to section 37 of the German Dangerous Substance Act of replacing carcinogenic working materials.

SUMMARY OF THE INVENTION

The invention therefore relates to an improved process for the continuous preparation of oleum of a concentration of 10 to 45% by weight of $SO_3$ and/or sulphuric acid of a concentration of 94 to 100% by weight of $H_2SO_4$ by combusting sulphur with atmospheric oxygen according to the principle of superstoichiometric combustion, cooling the resultant sulphur-dioxide-containing gases to 350° C. to 500° C., catalytically converting the cooled gases to give sulphur-trioxide-containing gases in the presence of a vanadium-containing catalyst using single or double contact catalysis, absorbing the sulphur-trioxide-containing gases after cooling, optionally removing liquids from the gases after absorption and energy recovery, the improvement comprising injecting liquid sulphur into the hot combustion gas stream perpendicular to the main direction of flow in the form of a fan using one or more bimodal fan-type nozzles.

BRIEF DESCRIPTION OF THE DRAWINGS

FIG. 2 shows graphically a selection of operating sequences of a fan-type nozzle to be implemented.

DETAILED DESCRIPTION OF THE INVENTION

In the achievement of the inventive object, the sulphur is burnt in a special combustion chamber suitable for the combustion of liquid sulphur having a cooled oven wall. The combustion chamber is cooled via a steam boiler, typically via an externally mounted boiler wall, which consists of individual tubes welded together. The sulphur is introduced in a single-stage and/or multistage manner via a plurality of special nozzles which are installed peripherally in the combustion space and have an atomization aid. Typically, the combustion gas stream enters the combustion space without swirl or with low swirl and flows through this combustion space in the form of back-flow-free and low-turbulence plug flow into the combustion space.

The combustion gas of atmospheric oxygen usually contains dry $SO_2$-/$(NO)_x$-containing gases from the thermal cleavage of sulphuric acid, which can contain up to 5 000 ppm of $(NO)_x$, calculated as NO. Preferably, the $SO_2$-containing gases used are dry cleavage gases from the thermal cleavage of waste sulphuric acids. These cleavage gases preferably contain 4 to 10% by volume of $O_2$, 2 to 9% by volume of $SO_2$, <200 ppm of CO, <2 000 ppm of $(NO)_x$, <50 ppm of hydrocarbon compounds and 82 to 90% by volume of $N_2$ and $CO_2$.

In a further variant of the process, the $SO_2$-containing dry gases which can contain up to 5 000 ppm of $(NO)_x$ used are combustion gases from the combustion of sulphur-containing materials.

Preferably, the ratio of the amount of $SO_2$ from the gases added from the thermal cleavage to the amount of $SO_2$ from the combustion of sulphur is between 1:5 and 3:1.

To carry out the process in accordance with the invention, the dry $SO_2$-containing gases can be introduced directly into the combustion chamber in which the combustion of the liquid sulphur with oxygen is carried out, or they can be introduced into the combustion chamber after mixture with the combustion air. It is important that the $SO_2$-containing gases which can contain up to 5 000 ppm of $(NO)_x$ (nitrous $SO_2$-containing gases) are burnt together with the sulphur. The NO content at the inlet of the combustion chamber can therefore be between 0 and 5 000 ppm. The combustion gas is preheated using heat of reaction from the catalyst system and customarily enters the combustion space at a temperature of 250 to 350° C. The sulphur can be burnt in the inventive process in a manner known per se in a single stage or in a plurality of stages, preferably in 2 stages.

By means of the special injection technique, in combination with the cooled combustion space and a two-stage arrangement, the flame temperature is kept in a range from 500° C. to 700° C., depending on the combustion output. The $(NO)_x$ present in the combustion air is chemically decomposed and the formation of new "thermal" $(NO)_x$ is prevented.

By means of a heat exchange surface design known to those skilled in the art in the evaporator and integrated superheater, it is ensured that the gas outlet temperature at the top of the apparatus can be adjusted between 350 and 500° C.

In the novel process, the liquid sulphur is injected in the shape of a fan into the combustion gas stream using special two-component nozzles. Preferably, here, the fan-type nozzles are pulse-operated at a frequency of 5 $s^{-1}$ to 70 $s^{-1}$.

Pulsed operation of the fan-type nozzles is carried out in an alternating cycle between dilution of liquid sulphur and impinging with dry air compressed to 2 to 10 bar and heated to 120° C. to 150° C., nitrogen or a corresponding combustion gas mixture. This pulse operation is usually termed "bimodal operating mode".

As a result of this pulse operation, the injection constantly alternates between pressure injection and two-component injection.

The fan-type nozzles are arranged in the form of a ring in the combustion chamber in groups each of 3 to 8, preferably 4. Between the combustion stages the $SO_2$-containing gases are cooled in each case via evaporator surfaces. After each combustion stage, the gas is preferably cooled to 400 to 600° C.

$SO_2$- and air-containing gas mixture enters from the bottom of, and into a vertically arranged combustion chamber. The wall of the combustion chamber consists of the tube wall of a natural circulation evaporator or forced circulation evaporator. The evaporation takes place in principle superstoichiometrically, that is to say with sufficient air excess, in a single to multistage manner, preferably single or two-stage manner. The air excess is preferably a molar ratio of $O_2$:$SO_2$ of 1.1 to 0.9.

In accordance with the objective of not forming nitrogen oxides in the combustion and reducing nitrogen oxides present in the combustion air, the bimodally atomizing fan-type nozzles are adapted. The following facts are taken into account for optimal atomization:

thermal $(NO)_x$ formation depends on the temperature peaks present in the flame, their temperature and exposure time, the reduction of existing and formed $(NO)_x$ depends on the surface area of the reducing sulphur and its uniform area distribution over the combustion chamber cross section.

For injecting the sulphur the following applies:

to distribute the sulphur as far as possible over the entire cross section in such a manner that the local release of heat per unit area and combustion air pass through is of equal size, to achieve the lowest possible combustion temperature, as far as possible to prevent turbulent mixture.

This is achieved if the sulphur is atomized perpendicularly to the flow of low-turbulence influent combustion air of the same velocity (plug flow) via a plurality of fan-type nozzles distributed peripherally on the circumference of the combustion chamber. In instances where the total amount of the sulphur to be injected is split and introduced successively with intermediate heat removal, it is possible, at low combustion temperatures, to increase the $SO_2$-content independently of the combustion temperature.

Figure 1A:
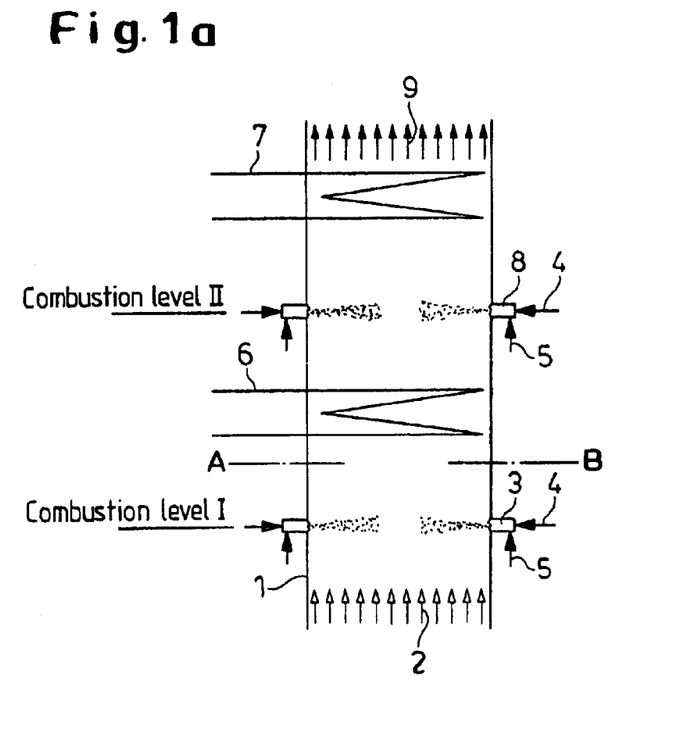
FIG. 1a shows a possible arrangement of fan-type nozzles (Nozzles in step A to B) in two combustion levels of an upright boiler 1.
Figure 1B:
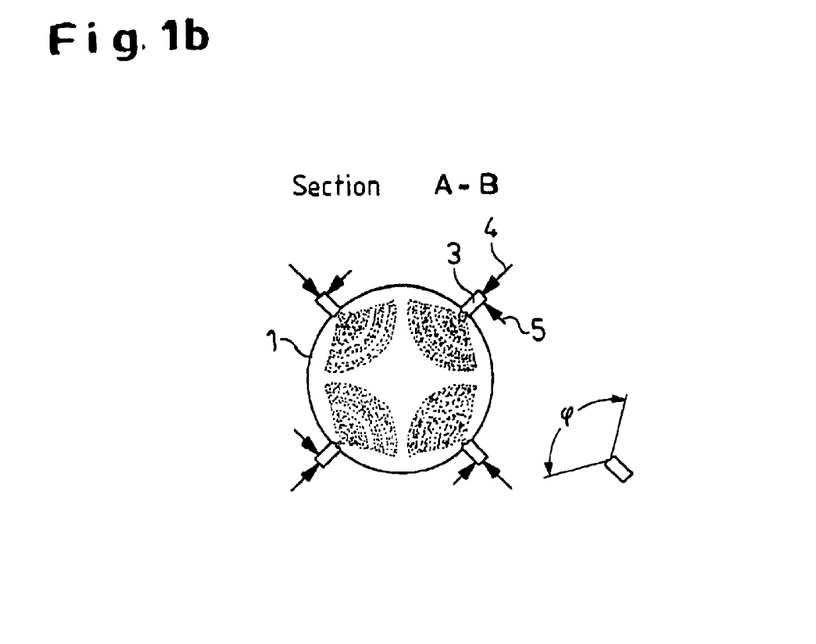
FIG. 1b shows section A–B of the fan type nozzles.
Figure 2A:
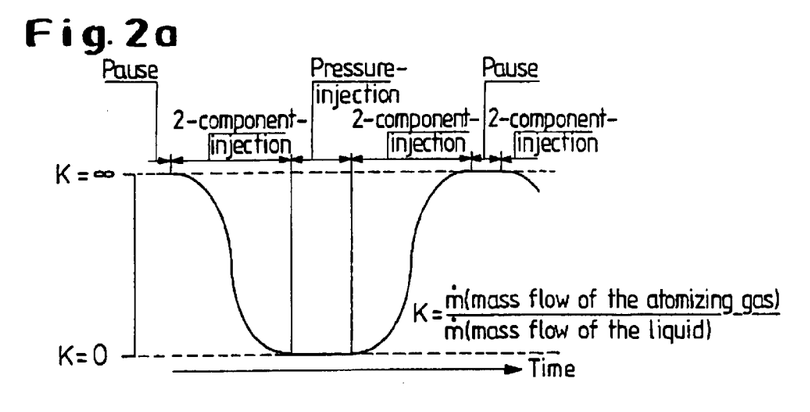
FIG. 2a shows operation with two constant operating states during an atomization period.
Figure 2B:
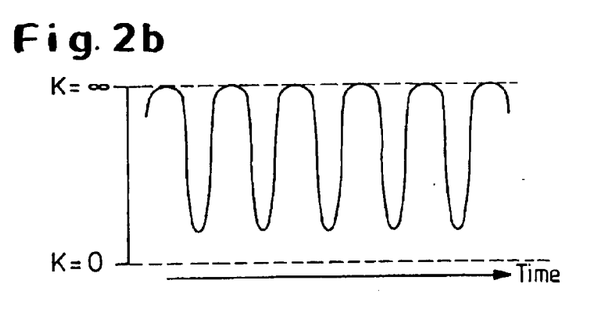
FIG. 2b shows a possible operating state in which an injection period is composed only of a pause and 2-component injection.
Figure 2C:
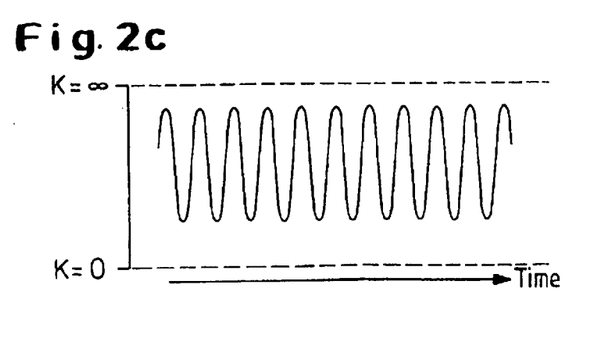
FIG. 2c shows a sequence consisting only of 2-component injection.
Figure 3:
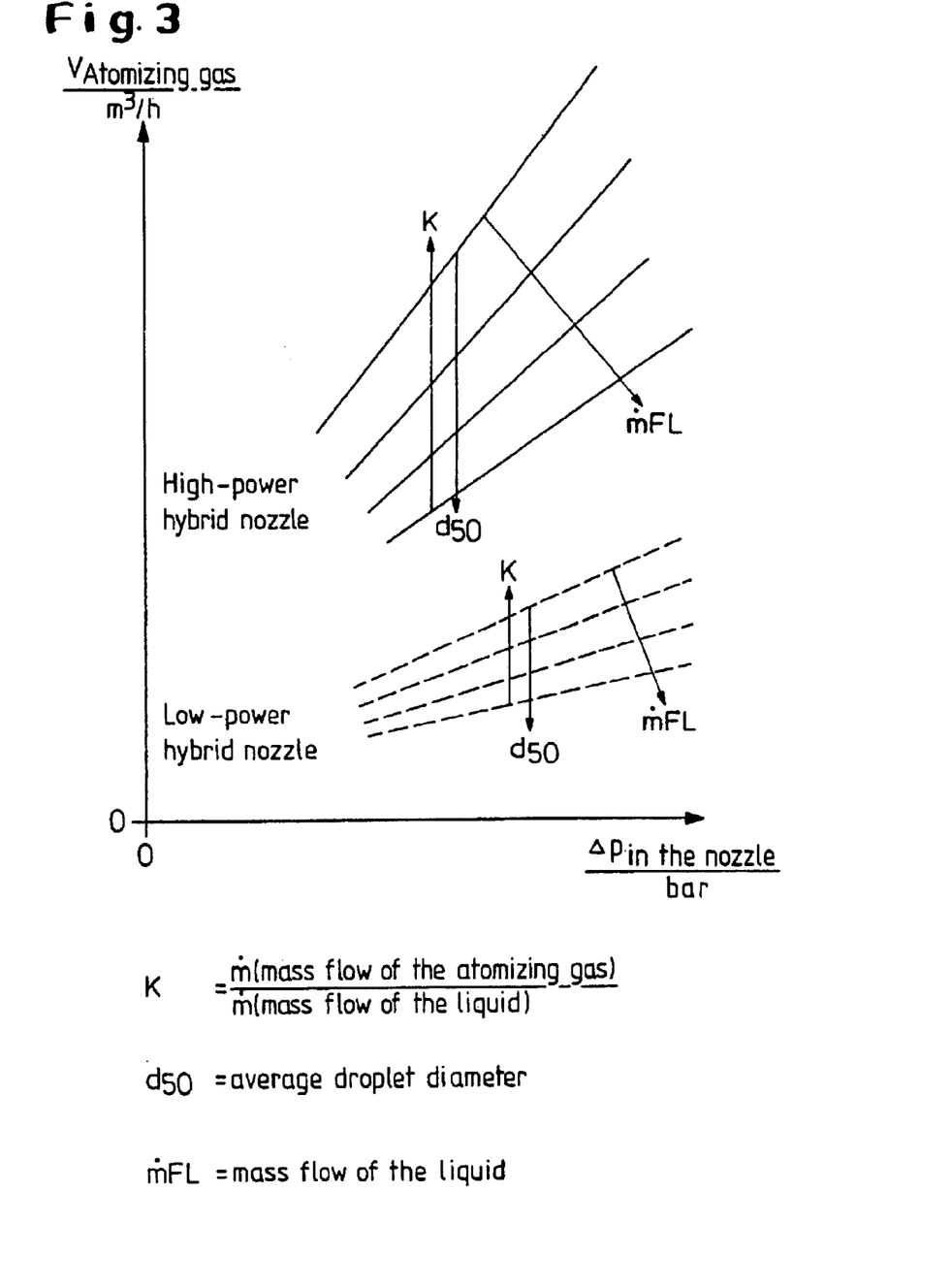
FIG. 3 shows qualitative throughput diagrams of two fan-type nozzles of differing size and output.
Figure 4:
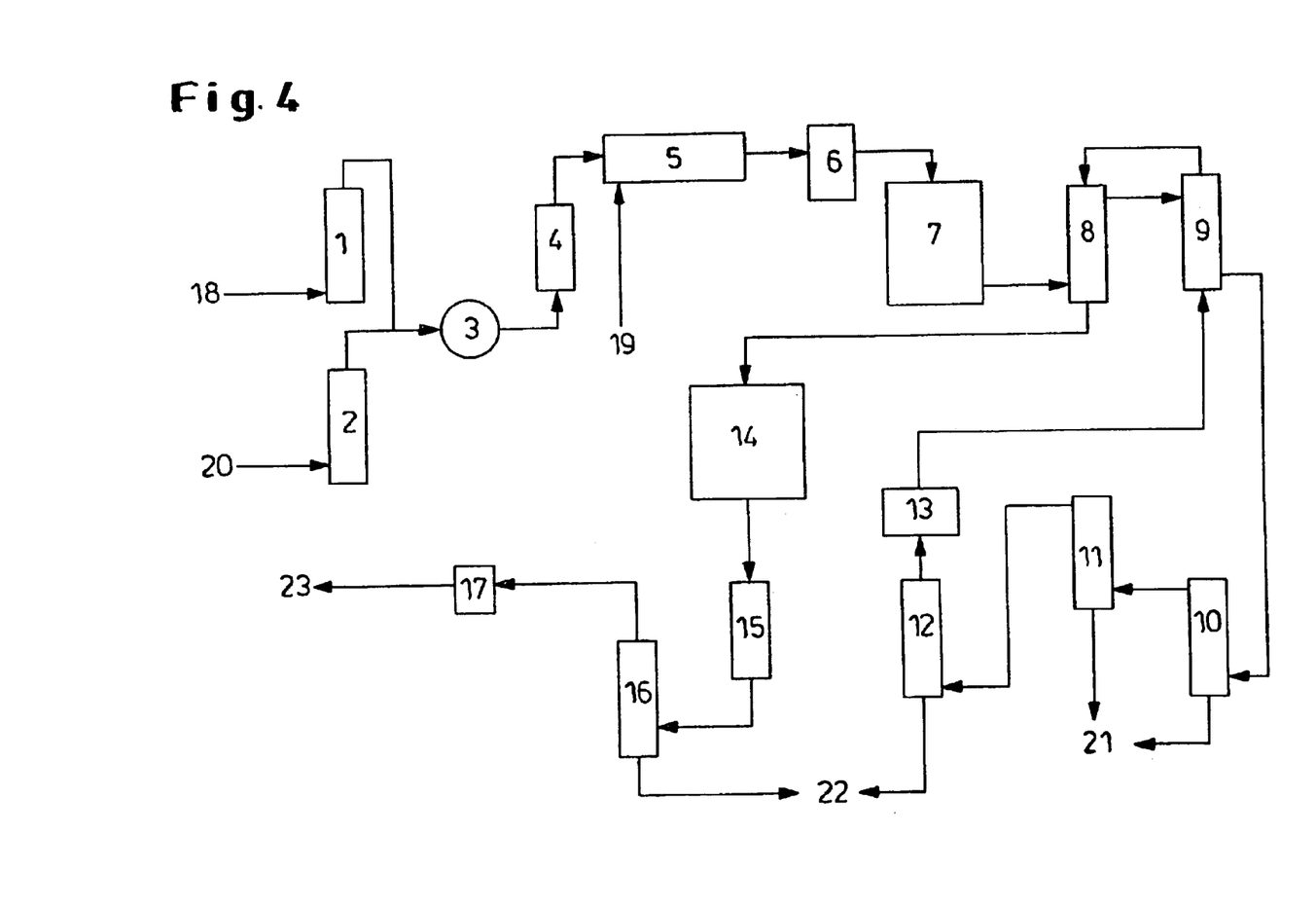
FIG. 4 shows a process diagram of embodiment of the inventive process, without the inventive process being restricted thereto.

The invention is further described with reference to the figures but without limitation thereto. FIG. 1 shows a possible arrangement of fan-type nozzles in two combustion levels of an upright boiler 1. Sulphur 4 is injected using atomizing gas 5 into the $(NO)_x$-containing combustion air 2 flowing in plug flow into the boiler 1 via a plurality of nozzles 3 having a fan-type injection pattern in the combustion level I. The section A–B shows the arrangement of nozzles at the circumference of the boiler in level I. After the combustion of the sulphur, heat is removed from the flowing gas by means of a first heat exchanger 6. Further downstream the remaining sulphur is injected into the combustion level II using hybrid nozzles 8 which can differ from the hybrid nozzles 3 of the combustion level I in number, output, spray angle and atomizing fineness. The subsequent heat exchanger typically represents the apparatuses required for steam generation and combustion air preheating. The $SO_2$-containing and denox-treated process gas 9 passes to the double-contact catalyst.

In accordance with the invention where the combustion temperature is to be the same or substantially the same at each point of the flame carpet, the heat release and thus the sulphur concentration per unit area must be identical or substantially identical. Accordingly, in the vicinity of the combustion chamber inner wall, because of the area which increases with the square of the radius, a different amount of sulphur is introduced in a uniformly distributed manner to that in the centre of the flame carpet. If the entire combustion chamber cross section is considered to be composed of an inner circle having diameter d and the annulus between the inner circle and inner combustion chamber wall having diameters D and d, and if it is further assumed that d is half of D, only one quarter of the sulphur passes into the inner surface enclosed by d, as opposed to three-quarters of the sulphur into the annulus.

FIG. 2 shows graphically a selection of operating sequences of a fan-type nozzle to be implemented. FIG. 2*a* shows operation with two constant operating states during an atomization period. The liquid is injected during a period between the pauses in which only atomizing gas leaves the hybrid nozzle. In this operating point, the ratio of mass flow rates of atomizing gas and liquid κ has the value infinity ($\kappa=\infty$). After the end of the pause, the 2-component injection starts firstly with a large amount of atomizing gas and very little liquid. With advancing time the liquid proportion increases and the proportion of atomizing gas becomes less up to $\kappa=0$, the point at which the fan-type nozzle operates as a pure pressure nozzle and this state is maintained for a short time. Thereafter the 2-component injection begins again, characterized by a variable mass flow ratio κ. At $\kappa=\infty$, the operating state "pause" is achieved; this completes an injection period.

As a result of the changing operating states, injection with a very large droplet size spectrum, up to 1:1 000, takes place. The finest droplets are produced at the start and at the end of the 2-component injection, and the largest during the pressure nozzle period. During the two phases of the 2-component injection, the size of the mean droplet diameter d50 changes constantly with the change in κ. The greatest throw distance is achieved with large droplets by pressure nozzle operation. The number of droplets generated and thus the proportion of droplets penetrating into the cross-flow gas can be influenced by varying pressure and pulse frequency.

FIG. 2*b* shows a possible operating state in which an injection period is composed only of a pause and 2-component injection. As a result not only the mean droplet size d50 but also the maximum droplet diameter decrease. The injection becomes finer and the throw distance decreases.

FIG. 2*c* shows a sequence consisting only of 2-component injection. During one period, neither the operating state achieves a pause nor does pressure injection take place.

FIG. 3 shows qualitative throughput diagrams of two fan-type nozzles of differing size and output. Using the mass flow rate of the liquid as a parameter, for both nozzles the volumetric flow rate of the atomizing gas is plotted against the pressure drop Δp of the fan-type nozzle. The two arrows pointing steeply downward give the direction of the increasing mass flow rate of the liquid. At a constant pressure drop, the increasing liquid mass flow rate m, the mean droplet diameter d50 increases; the mass flow rate ratio κ behaves in the opposite manner, it decreases.

Another factor influencing spray fineness is the spray angle φ. Since measurements of the droplet size for fan-type nozzles as a function of the spray angle φ are only known to date patchily, the effect of spray angle φ in fan-type nozzles whose gap width changes with the spray angle can only be estimated assuming that the relationship known from the pressure nozzle atomization in the case of nozzles having circular nozzle outlet such as $d50 \sim d_{bore\ hole}$ and $d50 \sim 1/\Delta p^{0.33}$ also applies to the fan-type nozzle. Based on a mean spray angle of $\phi=90°$, a change in the mean droplet diameter of up to 1% per 1° spray angle deviation from a mean spray angle $\phi=90$ would be expected.

The effect of the mass flow rate ratio κ on the atomization fineness in 2-component injection can be described to a first approximation with the e function $d50 \sim 1/e^{\kappa}$. Since the fan-type nozzle is usually operated in the range $0.05 \leqq \kappa 0.25$, small changes of κ lead to relatively large changes of the mean droplet diameter d50.

The atomization fineness is affected, as mentioned previously, by the gap width of the outlet slot which in the present embodiment is rectangular in silhouette. Higher throughputs require larger nozzles and thus also larger outlet slots with correspondingly wider gap. Since, as already mentioned, the gap width substantially influences the atomization fineness, d50 increases with κ=const. with the use of larger nozzles.

In the practice of the invention, interventions for adjusting injection fineness, droplet size spectrum and throw distance, the change in atomization fineness during operation by varying the pressure drop Δp at the nozzle, and, with the use of a plurality of lances distributed around the circumference, the possibility of changing nozzle during operation, the fan-type nozzle injection meets the requirements for $(NO)_x$-free sulphur combustion and additional denox treatment of the nitrogen oxides present in the combustion air better than the known prior art.

FIG. 4 shows an illustrative embodiment of the inventive process, without the inventive process being restricted thereto:

1 Air dryer
2 Gas dryer
3 Fan
4 Heat exchanger
5 Sulphur burner/steam boiler
6 Heat exchanger
7 Primary contact catalyst
8 Heat exchanger
9 Heat exchanger
10 Oleum absorber 1
11 Oleum absorber 2
12 Intermediate absorber
13 Filter
14 Secondary contact catalyst
15 Heat exchanger
16 Final absorber
17 Filter
18 Air
19 Sulphur
20 $SO_2$-$/(NO)_x$-containing gas from thermal cleavage of sulphuric acid or other sources 21 Oleum
22 Sulphuric acid
23 Stack off-gas The inventive process is to be described in more detail below with reference to the following examples, without a restriction to be understood herein.

EXAMPLES

Example 1

In an industrial plant for producing oleum of concentration 15 to 38% by weight of free $SO_3$ and sulphuric acid of concentration 96.5 to 99.5% by weight $H_2SO_4$, based on the combustion of liquid sulphur employing superstoichiometric sulphur combustion, and the 3+2 double contact catalyst process, 38 000 m³ (S.T.P.) of air are dried in a gas dryer at 65° C. In a combustion chamber, liquid sulphur is burnt via 4 two-component nozzles which are installed in the combustion space symmetrically together with an ignition nozzle, injected with the dried air and burnt to form $SO_2$-containing gas of a temperature of 651° C. The gas is fed to a 3-tray primary contact catalyst. The NO content in the comparative experiment without additional metering is below the limit of detection of the online measuring instrument of <2 mg of $NO/m^3$ (S.T.P.). The gas is processed in a known manner, as shown in FIG. 1, to give sulphuric acid 98.5% and oleum 35%.

The nozzles are arranged as shown in FIG. 1 in section A–B. The nozzles had an output, based on water, of 500 l/h (cross section DN 50). The outer protective air which does not participate in the injection was 30 m³/h per nozzle. In 4 nozzles, 3 450 kg of sulphur/h were injected at a pressure of 4.9 bar and 130° C. together with a total of 1 000 m³/h atomizing air at 130 degrees. The flame length extends to the opposite side, so that the total area of the combustion space is covered. The flame pattern of the bright white flame is uniform. As a result of introducing the air by means of radially arranged air boxes, the flame rolls, which causes a certain gas slip.

Upstream of the fan, varying amounts of NO gas are introduced into the dried air from a gas cylinder. The resultant measured values at the steam boiler outlet are shown in the following Table 1:

| Continuous feed of NO gas in [l/h] | mg of $NO/m^3$ (S.T.P.) at the oven outlet | Degradation rate in % based on the amount used |
|---|---|---|
| 0 | 1 | not applicable |
| 1 000 | 10 | 72 |
| 2 000 | 20 | 71 |
| 2 500 | 26 | 71 |

In the 2$^{nd}$ combustion level, similarly to the above-mentioned, at an original concentration of 100 mg of $NO/m^3$ (S.T.P.), 9 mg can reliably be achieved, equivalent to a degradation rate of 91%.

Example 2

In an experiment as above, plug flow was produced, however, by introducing air perpendicularly to the lame plane. The sulphur nozzles were arranged as shown in FIG. 5.

Figure 5:
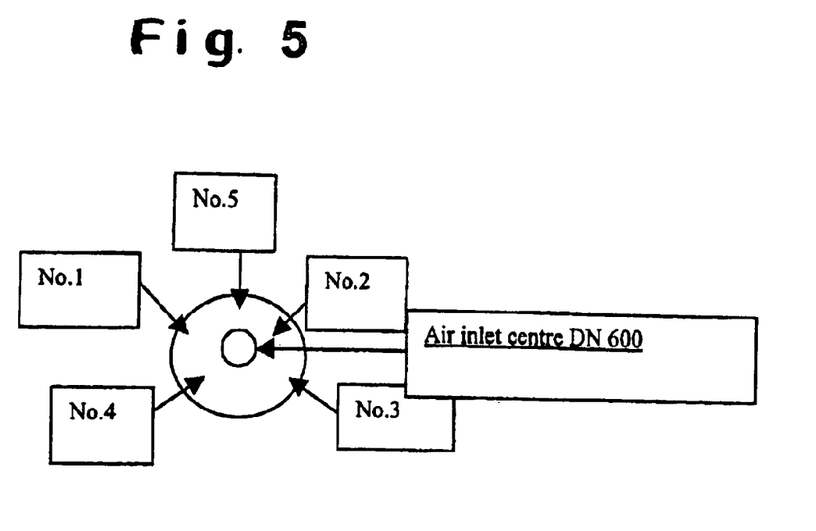
FIG. 5 shows a nozzle arrangement in according to the present invention.

Nozzle 5 in FIG. 5 is an ignition nozzle (self-ignition of sulphur by means of hot air approximately 500° C.).

a) Combustion with 2 Nozzles and Ignition Nozzle No. 5.

Using sulphur nozzles No. 1 (580 kg/h), No. 2 (830 kg/h) and No. 5 (590 kg/h), in total 2 000 kg of sulphur/h were burnt. The total air rate of approximately 25 550 m³ (S.T.P.)/h were preheated to 270° C. After the combustion, an $SO_2$-containing gas resulted at 440° C. having an $SO_2$ content of 5.48% by volume of $SO_2$. The sulphur pressure at the nozzles was 5.6 bar. The compressed air rate was in total 430 m³/h.

| Continuous feed of NO gas in [l/h] | mg of $NO/m^3$ (S.T.P.) in the combustion air (calculated) | mg of $NO/m^3$ (S.T.P.) at oven outlet | Degradation rate in % based on the amount used |
|---|---|---|---|
| 0 | 0 | 0 | Not applicable |
| 2 500 | 131 | 68 | 48 |
| 3 500 | 183 | 116 | 37 |
| 4 500 | 236 | 147 | 38 | b) Combustion with 3 Nozzles and Ignition Nozzle No. 5.

Using the sulphur nozzles No. 1 (660 kg of S/h), No. 2 (610 kg of S/h), No. 3 (900 kg of S/h) and No. 5 (410 kg of S/h), in total 2 580 kg of sulphur/h were burnt. The total air rate of approximately 36 330 m³ (S.T.P.)/h was preheated to 160° C. After the combustion, an $SO_2$-containing gas resulted at 913° C. having an $SO_2$ content of 5.01% by volume of $SO_2$. The sulphur pressure at the nozzles was 5.6 bar. The compressed air rate was in total 430 m³/h.

| Continuous feed of NO gas in [l/h] | mg of $NO/m^3$ (S.T.P.) in the combustion air (calculated) | mg of $NO/m^3$ (S.T.P.) at oven outlet | Degradation rate in % based on the amount used |
|---|---|---|---|
| 0 | 0 | 0 | Not applicable |
| 2 500 | 92 | 0 | 100 |
| 3 500 | 129 | 36 | 72 |
| 4 500 | 165 | 68 | 59 | c) Combustion with 4 Nozzles and Ignition Nozzle No. 5.

Using the sulphur nozzles No. 1 (810 kg of S/h), No. 2 (780 kg of S/h), No. 3 (490 kg of S/h), No. 4, (830 kg of S/h), No. 5 (690 kg of S/h), in total 3 600 kg of sulphur/h were burnt. The total air rate of approximately 44 800 m³ (S.T.P.)/h was preheated to 70° C. After the combustion, an $SO_2$-containing gas resulted at 835° C. having an $SO_2$ content of 5.48% by volume of $SO_2$. The sulphur pressure at the nozzles was 5.6 bar. The compressed air rate was in total 460 m³/h at a pressure of 5.5 bar.

| Continuous feed of NO gas in [l/h] | mg of NO/m³ (S.T.P.) in the combustion air (calculated) | mg of NO/m³ (S.T.P.) at oven outlet | Degradation rate in % based on the amount used |
|---|---|---|---|
| 0 | 0 | 0 | not applicable |
| 4 000 | 120 | 0 | 100 |

What is claimed is:

1. In an improved process for the continuous preparation of oleum of a concentration of 10 to 45% by weight of $SO_3$ and/or sulphuric acid of a concentration of 94 to 100% by weight of $H_2SO_4$ by combusting sulphur with atmospheric oxygen according to the principle of superstoichiometric combustion in a combustion chamber, cooling the resultant sulphur-dioxide-containing gases to 350° C. to 500° C., catalytically converting the resulting cooled gases to give sulphur-trioxide-containing gases in the presence of a vanadium-containing catalyst using single or double contact catalysis, absorbing the sulphur-trioxide-containing gases after cooling, optionally removing liquids from the gases after absorption and energy recovery, the improvement comprising injecting the sulphur as liquid sulphur into the hot combustion gas stream perpendicular to the main direction of flow in the form of a fan using one or more bimodal fan-type nozzles operating in pulsed operation, wherein injecting alternates between pressure injection and two-component injection.

2. The process according to claim 1, further comprising adding dry $SO_2$-/$(NO)_x$n-containing gases from thermal cleavage of sulphuric acid which contain up to 5 000 ppm of $(NO)_x$, calculated as NO, to the atmospheric oxygen.

3. The process according to claim 2, wherein the dry $SO_2$-containing and $(NO)_x$n-containing gases from the thermal cleavage of sulphuric acid contain 4 to 10% by volume of $O_2$, 2 to 9% by volume of $SO_2$, <200 ppm of CO, <2 000 ppm of $(NO)_x$, <50 ppm of hydrocarbon compounds and 82 to 90% by volume of $N_2$ and $CO_2$.

4. The process according to claim 1 wherein the combustion chamber is vertically arranged into a natural circulation or forced circulation evaporator.

5. The process according to claim 1 wherein the liquid sulphur is introduced into the combustion chamber via 3 to 8 fan type nozzles, arranged in a ring.

6. The process according to claim 1 wherein the fan-type nozzles are periodically alternately fed with liquid sulphur and with dry air compressed to 2 to 10 bar and heated to 120° C. to 150° C., nitrogen or a combustion gas mixture.

7. The process according to claim 1 wherein the sulphur is atomized at an angle of 70° to 110° perpendicularly to the direction of flow of the combustion gas stream.

8. The process according to claim 2 wherein the combustion chamber is vertically arranged into a natural circulation or forced circulation evaporator.

9. The process according to claim 2 wherein the liquid sulphur is introduced into the combustion chamber via 3 to 8 fan type nozzles, arranged in a ring.

10. The process according to claim 2 wherein, the fan-type nozzles are periodically alternately fed with liquid sulphur and with dry air compressed to 2 to 10 bar and heated to 120° C. to 150° C., nitrogen or a combustion gas mixture.

11. The process according to claim 2, wherein the sulphur is atomized at an angle of 70° to 110° perpendicularly to the direction of flow of the combustion gas stream.

* * * * *